United States Patent
Chiba et al.

(10) Patent No.: US 7,852,561 B2
(45) Date of Patent: *Dec. 14, 2010

(54) OPTICAL COMPENSATION LAYER-ATTACHED POLARIZING PLATE, LIQUID CRYSTAL PANEL, LIQUID CRYSTAL DISPLAY, IMAGE DISPLAY, AND METHOD FOR PRODUCING OPTICAL COMPENSATION LAYER-ATTACHED POLARIZING PLATE

(75) Inventors: Tsuyoshi Chiba, Ibaraki (JP); Ikuo Kawamoto, Ibaraki (JP); Satoru Kawahara, Ibaraki (JP); Masahiro Hata, Ibaraki (JP); Nobuyuki Kozonoi, Ibaraki (JP); Shunsuke Shuto, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 800 days.

This patent is subject to a terminal disclaimer.

(21) Appl. No.: 11/667,943

(22) PCT Filed: Nov. 16, 2005

(86) PCT No.: PCT/JP2005/021035

§ 371 (c)(1),
(2), (4) Date: May 17, 2007

(87) PCT Pub. No.: WO2006/054597

PCT Pub. Date: May 26, 2006

(65) Prior Publication Data

US 2008/0043332 A1    Feb. 21, 2008

(30) Foreign Application Priority Data

Nov. 22, 2004    (JP)    ............................ 2004-337276

(51) Int. Cl.
*G02B 5/30*    (2006.01)
(52) U.S. Cl. .................... 359/497; 349/96; 349/119

(58) Field of Classification Search ............... None
See application file for complete search history.

(56) References Cited

U.S. PATENT DOCUMENTS 6,330,108 B1 * 12/2001 Nishikouji et al. .......... 359/499

(Continued)

FOREIGN PATENT DOCUMENTS

EP    1081535 A2    3/2001

(Continued)

OTHER PUBLICATIONS

International Search Report of PCT/JP2005/021035, date of mailing Feb. 7, 2006.

(Continued)

*Primary Examiner*—Stephone B Allen
*Assistant Examiner*—Derek S Chapel
(74) *Attorney, Agent, or Firm*—Westerman, Hattori, Daniels & Adrian, LLP

(57) ABSTRACT

An optical compensation layer-attached polarizing plate including a polarizing plate, an optical compensation layer and another optical compensation layer that are laminated in this order, wherein the optical compensation layer has the relation $nx_1 > ny_1 = nz_1$, including a resin with a photoelastic coefficient absolute value of at most $2.0 \times 10^{-11}$ $m^2/N$, and has an in-plane retardation $(nx_1 - ny_1)d_1$ in the range of 200 nm to 300 nm, the optical compensation layer has the relation $nx_2 > ny_2 > nz_2$, including a resin with a photoelastic coefficient absolute value of at most $2.0 \times 10^{-11}$ $m^2/N$, and has an in-plane retardation $(nx_2 - ny_2)d_2$ in the range of 90 nm to 160 nm, a slow axis of the optical compensation layer makes an angle of 10° to 30° with an absorption axis of the polarizing plate, and a slow axis of the optical compensation layer makes an angle of 75° to 95° with the absorption axis of the polarizing plate.

13 Claims, 2 Drawing Sheets

U.S. PATENT DOCUMENTS

| | | | |
|---|---|---|---|
| 7,423,714 B2 * | 9/2008 | Chiba et al. | 349/119 |
| 2003/0067574 A1 | 4/2003 | Sasaki et al. | |
| 2004/0174477 A1 | 9/2004 | Okamoto et al. | |
| 2004/0201805 A1 | 10/2004 | Nishikouji et al. | |
| 2004/0227876 A1 | 11/2004 | Okumura | |
| 2009/0122236 A1 * | 5/2009 | Shutou et al. | 349/96 |

FOREIGN PATENT DOCUMENTS

| | | |
|---|---|---|
| JP | 7-253573 A | 10/1995 |
| JP | 10-68816 A | 3/1998 |
| JP | 11-242226 A | 9/1999 |
| JP | 2001-209065 A | 8/2001 |
| JP | 2003-114325 A | 4/2003 |
| JP | 2004-279566 A | 10/2004 |
| WO | 2004-053580 A1 | 6/2004 |

OTHER PUBLICATIONS

Translation of International Preliminary Report on Patentability mailed May 31, 2007 of International Application No. PCT/JP2005/021035.

Extended European Search Report, issued Jun. 7, 2010 for corresponding European Patent Application No. 05807038.4.

Japanese Office Action date Apr. 11, 2010, issued in corresponding Japanese Patent Application No. 2005-327389.

* cited by examiner

[FIG.1]
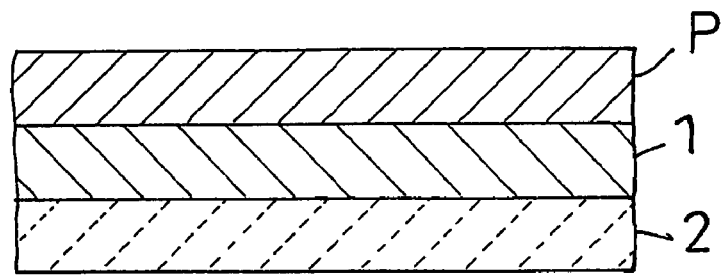
[FIG.2]
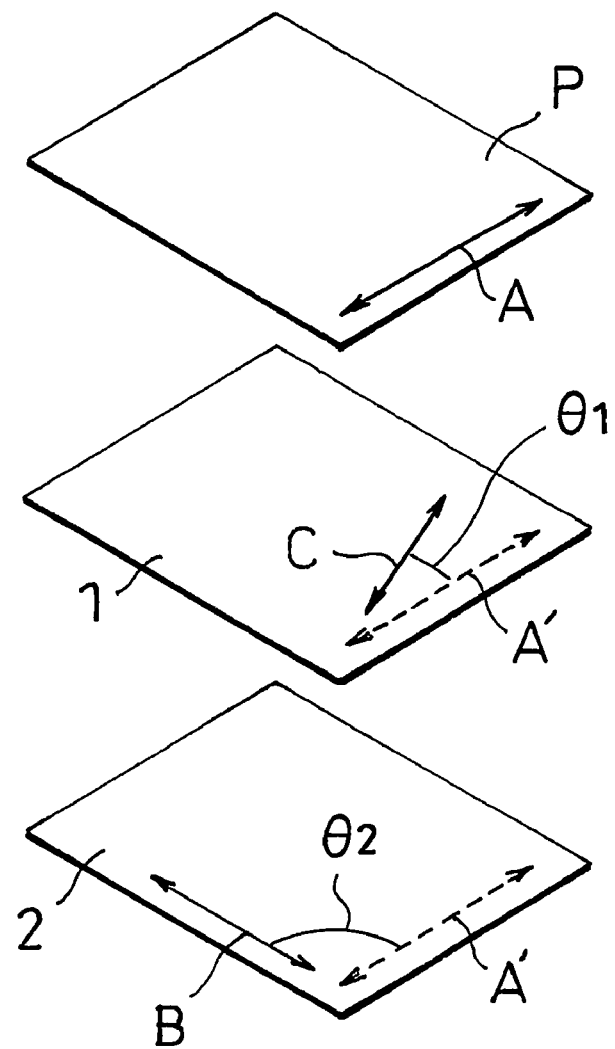

[FIG.3]
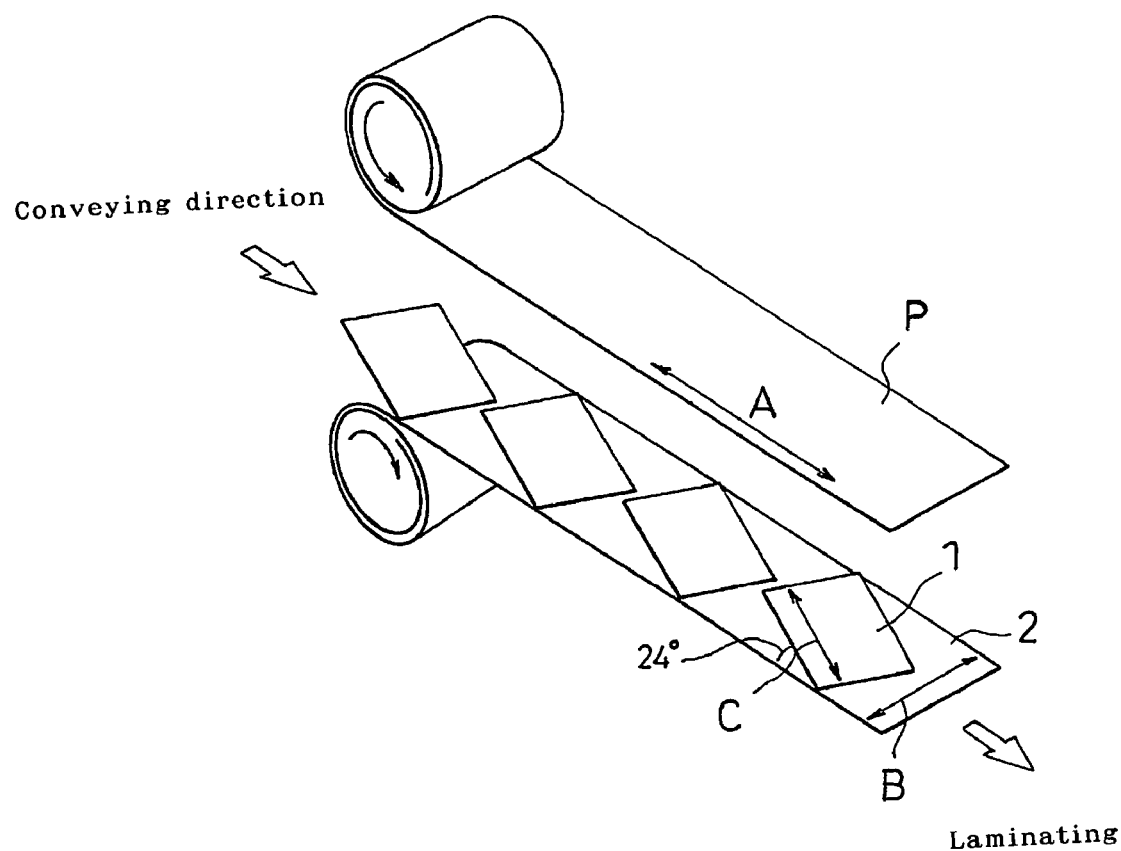

OPTICAL COMPENSATION LAYER-ATTACHED POLARIZING PLATE, LIQUID CRYSTAL PANEL, LIQUID CRYSTAL DISPLAY, IMAGE DISPLAY, AND METHOD FOR PRODUCING OPTICAL COMPENSATION LAYER-ATTACHED POLARIZING PLATE

TECHNICAL FIELD

The invention relates to an optical compensation layer-attached polarizing plate and a manufacture method thereof. The optical compensation layer-attached polarizing plate of the invention is useful as a circularly polarizing plate and may be used alone or in combination with any other optical film to form a variety of optical films.

The invention also relates to a liquid crystal panel using the optical compensation layer-attached polarizing plate and to a liquid crystal display using the liquid crystal panel. In particular, the optical compensation layer-attached polarizing plate of the invention is effective for use in liquid crystal panels or liquid crystal displays using vertical alignment (VA) mode liquid crystal cells. In particular, the optical compensation layer-attached polarizing plate of the invention is effective for reflective or transflective VA mode liquid crystal cells. The optical compensation layer-attached polarizing plate may be used for image displays such as organic electroluminescence (EL) displays and plasma display panels (PDPs) as well as liquid crystal displays.

BACKGROUND ART

Conventional liquid crystal displays include transmissive type liquid crystal displays and reflective liquid crystal displays. Besides them, transflective type liquid crystal displays are proposed, which use ambient light, like reflective liquid crystal displays, in light places, and use an internal light source such as a backlight to make display visible, in dark places (see Patent Literatures 1 and 2 below). Such transflective type liquid crystal displays use both reflective and transmissive display systems and select either of reflective display mode and transmissive display mode depending on ambient brightness, so that they can provide clear display even in dark environments while reducing power consumption. Thus, they are suitable for display parts of mobile devices.

Concerning such transflective type liquid crystal displays, a certain liquid crystal display is proposed, which includes a liquid crystal layer sandwiched between upper and lower substrates and includes a reflective film that is a metal film, such as an aluminum film, having apertures for light transmission and formed on the inside surface of the lower substrate, wherein the reflective film functions as a transflective plate. When this system operates in a reflective mode, ambient light incident from the upper substrate side is allowed to pass through the liquid crystal layer and then reflected from the reflective film on the inside surface of the lower substrate and allowed to pass through the liquid crystal layer again and emitted from the upper substrate side to contribute to display. In a transmissive mode, light incident from a backlight on the lower substrate side is allowed to pass through the liquid crystal layer from the apertures of the reflective film and then emitted from the upper substrate side to the outside to contribute to display. In the region having the reflective film, the aperture region serves as a transmissive display region, while the remaining region serves as a reflective display region.

In liquid crystal displays, polarizing plates are used, and in order to improve image quality, optical films made of various polymer materials are used as optical compensation layers. Optical compensation layers are properly selected depending on the liquid crystal display mode (such as twisted nematic (TN), vertical alignment (VA), optically compensated bend (OCB), and in-plane switching (IPS)). For example, conventional reflective or transflective VA mode liquid crystal displays have the problem of contrast reduction, because they can cause light leakage when black viewing is displayed. In VA mode liquid crystal cells, therefore, circularly polarizing plates with a quarter wavelength plate are used as optical compensation layers in order to widen the viewing angle of the liquid crystal displays. For example, uniaxially oriented polymer films are used for such optical compensation layers.

An optical compensation layer-attached polarizing plate with a large overall thickness is undesirable for liquid crystal displays, which should be designed to be thin. Liquid crystal displays can be placed in various environments of severe temperature or the like, and particularly under heated conditions, unevenness or irregularities can easily occur due to film shrinkage and the like. Thus, it is desired that uneven heat-up should be prevented in optical compensation layer-attached polarizing plates.

Patent Literature 1: JP-A No. 11-242226
Patent Literature 2: JP-A No. 2001-209065

DISCLOSURE OF THE INVENTION

Problems to be Solved by the Invention

It is an object of the invention to provide an optical compensation layer-attached polarizing plate with which viewing angle compensation and broadband circular polarization can be achieved for VA mode liquid crystal cells, with which a thin structure is possible, and with which uneven heat-up can be reduced. It is another object of the invention to provide an optical compensation layer-attached polarizing plate with which light leakage can be suppressed to be small when black viewing is displayed. It is a yet another object of the invention to provide a method for producing such an optical compensation layer-attached polarizing plate.

It is still another object of the invention to provide a liquid crystal panel using the optical compensation layer-attached polarizing plate, to provide a liquid crystal display using the liquid crystal panel and to provide an image display using the optical compensation layer-attached polarizing plate.

Means for Solving the Problems

As a result of active investigations for solving the above problems, the inventors have found that the objects can be achieved with the optical compensation layer-attached polarizing plate described below or the like, and have completed the invention.

The present invention relates to an optical compensation layer-attached polarizing plate, comprising a polarizing plate, an optical compensation layer (1) and another optical compensation layer (2) that are laminated in this order, wherein the optical compensation layer (1) has the relation $nx_1 > ny_1 = nz_1$, comprises a resin with a photoelastic coefficient absolute value of at most $2.0 \times 10^{-11}$ $m^2/N$, and has an in-plane retardation $(nx_1 - ny_1)d_1$ in the range of 200 nm to 300 nm, where $nx_1$ is a refractive index in the direction of X axis along which the film in-plane refractive index is maximum, $ny_1$ is a refractive index in the direction of Y axis perpendicular to X axis, $nz_1$ is a refractive index in the direction of Z axis that is the film thickness direction, and $d_1$ is the film thickness (nm), the optical compensation layer (2) has the relation $nx_2>ny_2>nz_2$, comprises a resin with a photoelastic coefficient absolute value of at most $2.0\times10^{-11}$ m$^2$/N, and has an in-plane retardation $(nx_2-ny_2)d_2$ in the range of 90 nm to 160 nm, where $nx_2$ is a refractive index in the direction of X axis along which the film in-plane refractive index is maximum, $ny_2$ is a refractive index in the direction of Y axis perpendicular to X axis, $nz_2$ is a refractive index in the direction of Z axis that is the film thickness direction, and $d_2$ is the film thickness (nm), a slow axis of the optical compensation layer (1) makes an angle of 10° to 30° with an absorption axis of the polarizing plate, and a slow axis of the optical compensation layer (2) makes an angle of 75° to 95° with the absorption axis of the polarizing plate.

It is thinkable to use an optical compensation layer-attached polarizing plate used for VA mode liquid crystal cell that is a laminate comprising a polarizing plate and optical compensation layers including a half wavelength plate of a uniaxially-oriented film, a quarter wavelength plate of a uniaxially-oriented film and a negative C-plate, which are laminated in this order on the polarizing plate in order to provide viewing angle compensation and broadband circular polarization. However, such an optical compensation layer-attached polarizing plate has a four-layer structure and thus has a large total thickness. In contrast, the optical compensation layer-attached polarizing plate of the invention includes a polarizing plate, an optical compensation layer (1) with an in-plane retardation of about λ/2 and another optical compensation layer (2) with an in-plane retardation of about λ/4, which are laminated in this order on the polarizing plate at the specific angle to form a broadband circularly polarizing plate. In addition, the optical compensation layer (2) having the relation $nx_2>ny_2>nz_2$ is used to impart a viewing angle compensation function. The optical compensation layer (2) is a single layer and can combine the functions of a quarter wavelength plate, which is a uniaxially-oriented film, and a negative C-plate, so that it can form a thin structure.

In the optical compensation layer-attached polarizing plate of the invention, both the optical compensation layers (1) and (2) contain a resin with a photoelastic coefficient absolute value of at most $2.0\times10^{-11}$ m$^2$/N so that even when contraction stress is caused by heating, the retardation can hardly be changed and heat-induced unevenness can be suppressed. In addition to the use of the material with a small photoelastic coefficient, the number of laminated layers is reduced as mentioned above, so that the number of shrinkable films and pressure-sensitive adhesive layers are reduced. Thus, uneven heat-up can be significantly reduced at the time of heating.

In the optical compensation layer-attached polarizing plate, the optical compensation layer (2) preferably has an Nz coefficient in the range of 1.3 to 1.9, where the Nz coefficient is defined by the formula $Nz=(nx_2-nz_2)/(nx_2-ny_2)$. The Nz coefficient of the optical compensation layer (2) is preferably set within the above range, in terms of viewing angle characteristics.

In the optical compensation layer-attached polarizing plate, an optical film produced by uniaxially stretching a polymer film comprising a norbornene resin is preferably used as the optical compensation layer (1).

In the optical compensation layer-attached polarizing plate, an optical film produced by biaxially stretching a polymer film comprising a norbornene resin is preferably used as the optical compensation layer (2) is In the optical compensation layer-attached polarizing plate, a laminate that the polarizing plate, the optical compensation layer (1) and the optical compensation layer (2) are laminated with a pressure-sensitive adhesive may be used.

The present invention also relates to a liquid crystal panel comprising the above optical compensation layer-attached polarizing plate and a liquid crystal cell. The optical compensation layer-attached polarizing plate of the invention has a good optical compensation function in the vertical direction (thickness direction) and is suitable for use in VA mode liquid crystal cells.

The present invention also relates to a liquid crystal display, comprising the above liquid crystal panel.

The present invention also relates to an image display, comprising the above optical compensation layer-attached polarizing plate.

The present invention also relates to a method for producing an optical compensation layer-attached polarizing plate comprising a polarizing plate, an optical compensation layer (1) and another optical compensation layer (2) that are laminated in this order, wherein the optical compensation layer (1) has the relation $nx_1>ny_1=nz_1$, comprises a resin with a photoelastic coefficient absolute value of at most $2.0\times10^{-11}$ m$^2$/N, and has an in-plane retardation $(nx_1-ny_1)d_1$ in the range of 200 nm to 300 nm, where $nx_1$ is a refractive index in the direction of X axis along which the film in-plane refractive index is maximum, $ny_1$ is a refractive index in the direction of Y axis perpendicular to X axis, $nz_1$ is a refractive index in the direction of Z axis that is the film thickness direction, and $d_1$ is the film thickness (nm), the optical compensation layer (2) has the relation $nx_2>ny_2>nz_2$, comprises a resin with a photoelastic coefficient absolute value of at most $2.0\times10^{-11}$ m$^2$/N, and has an in-plane retardation $(nx_2-ny_2)d_2$ in the range of 90 nm to 160 nm, where $nx_2$ is a refractive index in the direction of X axis along which the film in-plane refractive index is maximum, $ny_2$ is a refractive index in the direction of Y axis perpendicular to X axis, $nz_2$ is a refractive index in the direction of Z axis that is the film thickness direction, and $d_2$ is the film thickness (nm), comprising the steps of:

continuously conveying the polarizing plate and the optical compensation layer (2) from rolls thereof, respectively, in such a manner that an absorption axis of the polarizing plate makes an angle of 75° to 95° with a slow axis of the optical compensation layer (2) and that their longitudinal directions are aligned with each other, interposing the optical compensation layer (1) between the continuously conveyed polarizing plate and the optical compensation layer (2) in such a manner that a slow axis of the optical compensation layer (1) makes an angle of 10° to 30° with the absorption axis of the polarizing plate, and laminating the polarizing plate, the optical compensation layer (1) and the optical compensation layer (2).

In the optical compensation layer-attached polarizing plate of the invention, the optical compensation layers (1) and (2) can provide viewing angle compensation and broadband circular polarization. Thus, the thickness can be reduced so that the number of processes in the lamination of optical compensation layers can be reduced, with which an improvement in productivity and a reduction in cost can be provided. In the production method as stated above, the polarizing plate and the optical compensation layer (2) are each continuously conveyed from a roll or the like, while the optical compensation layer (1) is interposed between the conveyed materials at a specific angle to form a laminate, so that a further improvement in productivity and a further reduction in cost are possible. Thereafter, the resulting optical compensation layer-attached polarizing plate may be subjected to a punching process to give final product pieces.

BRIEF DESCRIPTION OF THE DRAWINGS

FIG. 1 is a cross-sectional diagram showing one embodiment of the optical compensation layer-attached polarizing plate according to the invention;

FIG. 2 is a schematic diagram showing angles between the absorption axis of the polarizing plate and the slow axes of optical compensation layers in the optical compensation layer-attached polarizing plate according to the invention;

FIG. 3 is a schematic diagram showing one embodiment of the method for producing the optical compensation layer-attached polarizing plate according to the invention.

DESCRIPTION OF REFERENCE MARKS

In the drawings, reference mark 1 represents an optical compensation layer (1), 2: another optical compensation layer (2), P: a polarizing plate, A: an absorption axis of a polarizing plate, B: a slow axis of the optical compensation layer (2), and C: a slow axis of the optical compensation layer (1).

BEST MODE FOR CARRYING OUT THE INVENTION

The optical compensation layer-attached polarizing plate of the invention is described below with reference to the drawings. Referring to FIG. 1, the optical laminated film according to the invention includes a polarizing plate (P), an optical compensation layer (1) and another optical compensation layer (2), which are laminated in this order. In FIG. 1, the polarizing plate (P), the optical compensation layer (1) and the optical compensation layer (2) may be laminated though a pressure-sensitive adhesive layer. The pressure-sensitive adhesive layer may be a single layer or a laminate of two or more layers.

A polarizing plate (P) may be used as a polarizer with a transparent protective film prepared on one side or both sides of the polarizer. The polarizer is not limited, various kinds of polarizer may be used. For example, a polarizer may be a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. Of these, a polyvinyl alcohol type film on which dichromatic materials (iodine, dyes) is absorbed and oriented after stretched is preferable used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the transparent protective film prepared on one side or both sides of the polarizer, materials is excellent in transparency, mechanical strength, heat stability, water shielding property, isotropy, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protective film, which can be determined arbitrarily, is 10 to 500 μm less in viewpoint of strength, work handling and thin layer, preferably 20 to 300 μm, and especially preferably 30 to 300 μm.

Moreover, it is preferable that the transparent protective film may have as little coloring as possible. Accordingly, a protective film having thickness direction retardation represented by $Rth=(nx-nz) \times d$ of −90 nm to +75 nm (where, nx represent refractive index in the film plane at slow axis direction, nz represents refractive index in the film thickness direction, and d represents a film thickness) may be preferably used. Thus, coloring (optical coloring) of polarizing plate resulting from a protective film may mostly be cancelled using a protective film having a thickness direction retardation (Rth) of −90 nm to +75 nm. The thickness direction retardation (Rth) is preferably −80 nm to +60 nm, and especially preferably −70 nm to +45 nm.

As a transparent protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Adhesives are used for adhesion processing of the above described polarizer and the protective film. As adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the above protective film.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

The polarizing plate (P) preferably has a thickness of about 60 to about 220 μm, more preferably of 90 to 200 μm (about 100 μm) in order that the optical compensation layer-attached polarizing plate may have a small overall thickness.

The optical compensation layer (1) has the relation $nx_1 > ny_1 = nz_1$, comprises a resin with a photoelastic coefficient absolute value of at most $2.0 \times 10^{-11}$ m$^2$/N, and has an in-plane retardation $(nx_1 - ny_1)d_1$ in the range of 200 nm to 300 nm, where $nx_1$ is a refractive index in the direction of X axis along which the film in-plane refractive index is maximum, $ny_1$ is a refractive index in the direction of Y axis perpendicular to X axis, $nz_1$ is a refractive index in the direction of Z axis that is the film thickness direction, and $d_1$ is the film thickness (nm).

Any resin that has a photoelastic coefficient absolute value of $2.0 \times 10^{-11}$ m$^2$/N or less may be used without particular limitations for the optical compensation layer (1). The absolute value of the photoelastic coefficient is preferably $1.5 \times 10^{-11}$ m$^2$/N or less, more preferably $1.0 \times 10^{-11}$ m$^2$/N or less, in terms of preventing uneven heat-up at the time of heating. Examples of resins satisfying such photoelastic coefficient requirements include norbornene resins and cellulose resins. In particular, norbornene resins are preferred.

For example, such norbornene resins are described in JP-A No. 01-240517. Examples of norbornene resins specifically include ring-opened (co)polymers of norbornene monomers, modified polymer products thereof such as maleic acid adducts and cyclopentadiene adducts thereof, and hydrogenated resin products thereof; resins prepared by addition polymerization of norbornene monomers; and resins prepared by addition copolymerization of norbornene monomers and olefin monomers such as ethylene and α-olefins. The polymerization and the hydrogenation may be performed by any conventional method.

Examples of the norbornene monomers include norbornene and alkyl- and/or alkylidene-substituted products thereof such as 5-methyl-2-norbornene, 5-dimethyl-2-norbornene, 5-ethyl-2-norbornene, 5-butyl-2-norbornene, and 5-ethylidene-2-norbornene, and polar group (such as halogen)-substituted products thereof; dicyclopentadiene, 2,3-dihydrodicyclopentadiene or the like; dimethanooctahydronaphthalene and alkyl- and/or alkylidene-substituted products thereof and polar group (such as halogen)-substituted products thereof, such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1, 4:5,8-dimethano-1,4,4a,5,6,7,8,8a-octahydronaphthalen e, 6-chloro-1,4:5,8-dimethano-1,4,4a,5,6,7,8,8a-octahydronaphthalene, 6-cyano-1, 4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaph thalene; and trimers or tetramers of cyclopentadiene, such as 4,9:5,8-dimethano-3a,4,4a,5,8,8a,9,9a-octahydro-1H-benzoindene and 4, 11:5, 10:6,9-trimethano-3a, 4,4a,5,5a,6,9,9a,10,10a,11,11a-dodecahydro-1H-cyclopentaanthracene.

The norbornene resins may be used in combination with other ring-opening polymerizable cycloolefins, as long as the objects of the invention are not defeated. Examples of such cycloolefins include compounds having a single reactive double bond, such as cyclopentene, cyclooctene and 5,6-dihydrodicyclopentadiene.

The number-average molecular weight (Mn) of the norbornene rein, which may be measured by a gel permeation chromatography (GPC) method with a toluene solvent, may be in the range of 25,000 to 200,000, preferably in the range of 30,000 to 100,000, more preferably in the range of 40,000 to 80,000. Number-average molecular weights in the above range can provide products with good mechanical strength, solubility, formability, and casting workability.

In the case where the norbornene resin is produced by hydrogenating a ring-opened polymer of a norbornene monomer, the degree of hydrogenation is generally 90% or more, preferably 95% or more, more preferably 99% or more, in terms of resistance to thermal degradation, resistance to photo-degradation, or the like.

Examples of commercially available products of the norbornene resins include ARTON G (trade name) manufactured by JSR Corporation, ZEONOR #1600 (trade name) and ZEONOR #1430 (trade name) manufactured by Nippon Zeon Co., Ltd., and APEL (trade name) manufactured by Mitsui Chemicals, Inc.

Cellulose resins include, but are not limited to, any ester of cellulose with an acid. Preferred examples of cellulose resins include esters of fatty acids with cellulose, such as cellulose triacetate, cellulose diacetate, cellulose tripropionate, and cellulose dipropionate. Among these cellulose resins, cellulose triacetate is preferred in terms of high transmittance. Cellulose triacetate is commercially available in the form of a film. Examples of such a commercially available product include UV-50, SH-50, UV-80, SH-80, TD-80U, TD-TAC, and UZ-TAC each manufactured by Fuji Photo Film Co., Ltd., Cellulose Triacetate 80 μm series manufactured by Konica Corporation, and Cellulose Triacetate 80 μm series manufactured by LONZA Japan. In particular, TD-80U manufactured by Fuji photo Film Co., Ltd. is preferred in terms of transmittance and durability.

The optical compensation layer (1) has the relation: $nx_1 > ny_1 = nz_1$ and has an in-plane retardation: $(nx_1 - ny_1)d_1$ in the range of 200 to 300 nm. The in-plane retardation is preferably from 220 to 280 nm, more preferably from 230 to 270 nm. The thickness direction retardation $(nx_1 - nz_1)d_1$ of the optical compensation layer (1) may be in the range of 200 to 300 nm, preferably from 220 to 280 nm, more preferably from 230 to 270 nm, similarly to the in-plane retardation.

The thickness ($d_1$) of the optical compensation layer (1) is preferably, but not limited to, from 30 to 70 μm, more preferably from 40 to 60 μm.

For example, the optical compensation layer (1) may be obtained by uniaxially stretching a polymer film containing the above resin. The stretching temperature is preferably from about 130 to about 150° C., more preferably form 135 to 145° C., still more preferably from 137 to 143° C. The stretch ratio is preferably from about 1.1 to about 2.05, more preferably from 1.2 to 2, still more preferably from 1.3 to 1.95.

The optical compensation layer (2) has the relation $nx_2 > ny_2 > nz_2$, comprises a resin with a photoelastic coefficient absolute value of at most $2.0 \times 10^{-11}$ m$^2$/N, and has an in-plane retardation $(nx_2 - ny_2)d_2$ in the range of 90 nm to 160 nm, where $nx_2$ is a refractive index in the direction of X axis along which the film in-plane refractive index is maximum, $ny_2$ is a refractive index in the direction of Y axis perpendicular to X axis, $nz_2$ is a refractive index in the direction of Z axis that is the film thickness direction, and $d_2$ is the film thickness (nm), Any resin that has a photoelastic coefficient absolute value of at most $2.0 \times 10^{-11}$ m$^2$/N may be used without particular limitations for the optical compensation layer (2). The absolute value of the photoelastic coefficient is preferably $1.5 \times 10^{-11}$ m$^2$/N or less, more preferably $1.0 \times 10^{-11}$ m$^2$/N or less, in terms of preventing uneven heat-up at the time of heating. Examples of resins satisfying such photoelastic coefficient requirements also include those listed for the optical compensation layer (1), such as norbornene resins and cellulose resins. In particular, norbornene resins are preferred.

The optical compensation layer (2) has the relation: $nx_2 > ny_2 > nz_2$ and has an in-plane retardation: $(nx_2 - ny_2)d_2$ in the range of 90 to 160 nm. The in-plane retardation is preferably from 100 to 150 nm, more preferably from 110 to 140 nm. The Nz coefficient of the optical compensation layer (2) is preferably controlled to be from 1.3 to 1.9, more preferably from 1.4 to 1.8, still more preferably from 1.4 to 1.7. If the Nz coefficient is controlled to be in the above range, the viewing angle characteristics can be improved. The thickness direction retardation $(nx_2 - nz_2)d_2$ of the optical compensation layer (2) may be in the range of 100 to 300 nm, preferably from 120 to 280 nm, more preferably from 140 to 250 nm.

The thickness ($d_2$) of the optical compensation layer (2) is preferably, but not limited to, from 20 to 60 μm, more preferably from 30 to 50 μm.

For example, the optical compensation layer (2) may be obtained by biaxially stretching a polymer film containing the above resin. The stretching temperature is preferably from about 130 to about 150° C., more preferably from 135 to 145° C., still more preferably from 137 to 143° C. Transverse stretching and longitudinal stretching may be performed. The transverse stretch ratio is preferably from about 1.17 to about 1.57, more preferably from 1.22 to 1.52, still more preferably from 1.27 to 1.5. Longitudinal stretching is preferably performed such that it can return the transverse stretching-induced shrinkage.

In the optical compensation layer-attached polarizing plate of the invention as shown in FIG. 2, the polarizing plate (P) and the optical compensation layers (1) and (2) are laminated such that the angle $\theta_1$ between the absorption axis A of the polarizing plate (P) and the slow axis C of the optical compensation layer (1) is set in the range of 10 to 30° and that the angle $\theta_2$ between the absorption axis A of the polarizing plate (P) and the slow axis B of the optical compensation layer (2) is set in the range of 75 to 95°. In FIG. 2, the absorption axis A is projected on the optical compensation layers (1) and (2), respectively, and such a projection is represented by A'. The optical compensation layers (1) and (2) are laminated such that the angles $\theta_1$ and $\theta_2$ made by the slow axes C and B, respectively, in relation to the polarizing plate (P) are each set in the above range, so that the optical compensation layers (1) and (2) can function as a broadband quarter wavelength plate. The angle $\theta_1$ is preferably from 14 to 30°, more preferably from 16 to 27°, still more preferably from 17 to 25°. The angle $\theta_2$ is preferably from 76 to 93°, more preferably from 78 to 92°.

While FIG. 1 shows no pressure-sensitive adhesive layer for the lamination of the polarizing plate (P) and the optical compensation layers (1) and (2), the optical compensation layer-attached polarizing plate of the invention may be prepared by lamination with a pressure-sensitive adhesive layer as described above.

As pressure-sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Proper method may be carried out to attach a pressure-sensitive adhesive layer. As an example, about 10 to 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a substrate or an optical film using suitable developing methods, such as flow method and coating method, or a method in which a pressure-sensitive adhesive layer is once formed on a separator, as mentioned above, and is then transferred on the above film may be mentioned.

The pressure-sensitive adhesive layer may contain additives, for example, such as natural or synthetic resins, tackifiers, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Thickness of a pressure-sensitive adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, ultraviolet absorbing property may be given to the above-mentioned each layer, such as the optical compensation layers (1), (2), and pressure-sensitive adhesive layer, using a method of adding UV absorbents, such as salicylic acid ester type compounds, benzophenol type compounds, benzotriazol type compounds, cyano acrylate type compounds, and nickel complex salt type compounds.

Any production method may be used to form the optical compensation layer-attached polarizing plate of the invention, as long as it achieves the lamination of the polarizing plate (P) and the optical compensation layers (1) and (2) in this order optionally with the pressure-sensitive adhesive layer in such a manner that the angles $\theta_1$ and $\theta_2$ made by the slow axes C and B of the optical compensation layers (1) and (2), respectively, with the absorption axis A of the polarizing plate (P) are each set in the above range. If the method described below is used, a roll-to-roll process can improve the productivity and reduce the cost. FIG. 3 shows the roll-to-roll process. In FIG. 3, the optical compensation layer (2) is produced by stretching a polymer film with its end fixed in the width direction in such manner that retardation is produced in the width direction. Thus, the optical compensation layer (2) has a slow axis B in the film width direction not in the film convey direction. For example, when the film is stretched in the width (transverse) direction, tension is also applied in the longitudinal direction (convey direction) of the film, so that the film can also be substantially stretched in the longitudinal direction by the longitudinal tension as the film shrinks in the longitudinal direction by the stretching in the width direction. In this process, the stretching force applied in the width direction of the film is greater than that applied in the longitudinal direction of the film, and thus the stretch ratio in the width direction is greater than that in the longitudinal direction, so that a slow axis is produced in the width direction of the film. This allows a roll-to-roll system.

In FIG. 3, a belt-shaped film of the polarizing plate (P) and a belt-shaped film of the optical compensation layer (2) are conveyed from rolls thereof, respectively. The angle between the absorption axis A of the polarizing plate (P) and the slow axis C of the optical compensation layer (2) is controlled to be in the range of 75 to 95°. The polarizing plate (P) and the belt-shaped film of the optical compensation layer (2) are continuously conveyed in such a manner that their longitudinal directions are aligned with each other. The optical compensation layer (1) is interposed between the continuously conveyed polarizing plate (P) and optical compensation layer (2) in such a manner that the slow axis C of the optical compensation layer (1) makes an angle of 10 to 30° with the absorption axis A of the polarizing plate. The optical compensation layer (1) interposed therebetween is a previously prepared cut piece with a specific size (a rectangle in FIG. 3). The optical compensation layer (1) may be stacked on either of the polarizing plate (P) and the optical compensation layer (2). A pressure-sensitive adhesive may be used for the lamination. In FIG. 3, the optical compensation layer (1) is inserted and stacked on the optical compensation layer (2) side.

The polarizing plate (P) and the optical compensation layer (2) may be the same in width, or one may be wider than the other. In general, the polarizing plate (P) and the optical compensation layer (2) each preferably have a width of about 400 to about 1600 mm, more preferably of 500 to 1500 mm. The size (the length and width) of the optical compensation layer (1) is preferably controlled in such a manner that it does not protrude from both of the polarizing plate (P) and the optical compensation layer (2), depending on the angle between the absorption axis A of the polarizing plate (P) and the slow axis C of the optical compensation layer (1).

The polarizing plate (P) and the optical compensation layers (1) and (2) are then laminated to form an optical compensation layer-attached polarizing plate. A pressure-sensitive adhesive may be used for the lamination. A pressure-sensitive adhesive layer may be formed on each of the polarizing plate (P) and the optical compensation layers (1) and (2) for the lamination thereof. Another pressure-sensitive adhesive layer may be formed on the polarizing plate (P) or the optical compensation layer (2) in order that the resulting optical compensation layer-attached polarizing plate may be adhered to any other component such as a liquid crystal cell. The optical compensation layer (1) interposed between the polarizing plate (P) and the optical compensation layer (2) is generally press-bonded between lamination rolls to form a laminate. Guide rolls (not shown) may be provided before and after the lamination rolls as needed. Thereafter, the resulting optical compensation layer-attached polarizing plate may be punched into product pieces. The punching is properly performed depending on the size of the optical compensation layer (1), which is previously designed to have a specific size.

The optical compensation layer-attached polarizing plate of the invention is suitable for use in image displays and particularly suitable for VA mode liquid crystal displays. In a liquid crystal display, the optical compensation layer-attached polarizing plate of the invention may be placed on the backlight side of a liquid crystal cell through a pressure-sensitive adhesive layer. While any side of the optical compensation layer-attached polarizing plate may be used for the lamination to the lower side (backlight side) of the liquid cell, it is preferred that the polarizing plate (P) is be located most distant from the liquid crystal cell. A liquid crystal is sealed in the liquid crystal cell. A transparent electrode may be formed on an upper substrate of the liquid crystal cell, while a reflective layer also serving as an electrode may be formed on a lower substrate of the liquid crystal cell. Another optical compensation layer-attached polarizing plate or various types of optical films for the liquid crystal display may be provided on the top of the upper liquid crystal cell substrate. Such an optical compensation layer-attached polarizing plate is also preferably set in such a manner that its polarizing plate is located most distant from the liquid crystal cell.

The optical compensation layer-attached polarizing plate of the invention may be preferably used to form a variety of devices such as transflective type liquid crystal displays. Such transflective type liquid crystal displays and the like are suitable for use in mobile information and communication devices and personal computers. The optical compensation layer-attached polarizing plate of the invention may also be used for any other type of liquid crystal display.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

An optical compensation layer-attached polarizing plate of the present invention is applied to various kind of liquid crystal displays. The optical compensation layer-attached polarizing plate can be laminated with other optical layers. There is especially no limitation about the optical layers, which may be used for formation of a liquid crystal display etc., such as a reflector, a transflective plate, a retardation plate (a half wavelength plate and a quarter wavelength plate included). The optical layers may be one layer or two or more layer. Especially preferable polarizing plates are; a reflection type polarizing plate or a transflective type polarizing plate in which a reflector or a transflective reflector is further laminated onto a polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two or more of optical layers as the above-mentioned separated type polarizing plate. Therefore, a polarizing plate may be a reflection type elliptically polarizing plate or a transflective type elliptically polarizing plate, etc. in which the above-mentioned reflection type polarizing plate or a transflective type polarizing plate is combined with above described retardation plate respectively.

Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that the optical compensation layer-attached polarizing plate by the present invention is used, there is especially no limitation to use any conventional methods. Also any liquid crystal cell of arbitrary type, such as twisted nematic type (TN type), and super-twisted nematic type (STN type), pi-cell type ($\pi$ type) may be used. Especially, vertical alignment type (VA type) is preferable.

Suitable liquid crystal displays, such as liquid crystal display with which a backlight or a reflector used for a lighting system is located at backside of the liquid crystal cell is may be manufactured. In this case, the optical compensation layer-attached polarizing plate by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10 nm in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Hereinafter, detailed descriptions for embodiments of the present invention will be given with reference to Examples and Comparative Examples, but these Examples and Comparative Examples do not limit the present invention. The characteristics of the optical compensation layer (1) and (2) of each Example were measured by following methods.

<Absolute Value of Photoelastic Coefficient>

Using Ellipsomter manufactured by Jasco Corporation (M220), a stress refractive index was measured when a stress of $1\times10^{-6}$ to $30\times10^{-6}$ was applied to an optical film with a width of 2 cm at room temperature (23° C.). The obtained measured values were plotted and the absolute value of photoelastic coefficient c: $(m^2/N)$ was calculated from stress birefringence $\Delta n = c\delta$. Where, $\delta$ represents stress $(N/m^2)$.

<Measurement of Refractive Index: Nz Coefficient and Retardation>

In measurement of refractive index of optical films, each of main refractive indices nx, ny, and nz in a film plane direction and in the thickness direction, respectively, were measured as a value for $\lambda=590$ nm using an automatic birefringence measuring equipment (manufactured by Oji Scientific Instruments, automatic birefringence meter KOBRA-31 PEW, measured at the elliptically polarizing plate measurement mode). Nz=(nx−nz)/(nx−ny) was calculated from obtained refractive index values. The in-plane retardation $\Delta$nd=(nx−ny)d and the thickness direction retardation Rth=(nx−nz)d were calculated from the refractive index values and the thickness (d nm) of the optical film.

Example 1

Polarizing Plate

A polyvinyl alcohol film (VF-PS manufactured by Kuraray Co., Ltd.) was stretched at a stretch ratio of about 6 in an aqueous solution containing iodine and potassium iodide and then dried to form a 30 μm-thick belt-shaped polarizer. A triacetyl cellulose film (25 μm in thickness) manufactured by Fuji Photo Film Co., Ltd. (serving as a belt-shaped protective film) was bonded to each of both sides of the polarizer with a polyvinyl alcohol adhesive so that an about 100 μm-thick belt-shaped polarizing plate (1300 mm in width) was prepared. In addition, an acrylic pressure-sensitive adhesive layer (20 μm in thickness) for adhering to the optical compensation layer (1) and a separator were sequentially formed on one side of the polarizing plate, having the protective film on the other side.

(Optical Compensation Layer (1))

An about 60 μm-thick belt-shaped film made of a norbornene resin with a photoelastic coefficient absolute value of $3.1\times10^{-12}$ $(m^2/N)$ was uniaxially stretched at a stretch ratio of 1.42 at 140° C. to form a 50 μm-thick belt-shaped optical compensation layer (1). The product was then punched into pieces with a specific size (longitudinal 500 mm and transverse 700 mm). An acrylic pressure-sensitive adhesive layer (20 μm in thickness) for adhering to the optical compensation layer (2) and a separator were sequentially formed on one side of the optical compensation layer (1). The optical compensation layer (1) had an in-plane retardation $\Delta$nd of 235 nm and a thickness direction retardation Rth of 235 nm.

(Optical Compensation Layer (2))

An about 60 μm-thick belt-shaped film made of a norbornene resin with a photoelastic coefficient absolute value of $3.1\times10^{-12}$ $(m^2/N)$ was transversely stretched at a stretch ratio of 1.48 at 138° C. and longitudinally stretched such that the longitudinal shrinkage by the transverse stretching was returned by the longitudinal stretching, so that a 40 μm-thick belt-shaped optical compensation layer (2) (1000 mm in width) was prepared. An acrylic pressure-sensitive adhesive layer (20 μm in thickness) for adhering to a liquid crystal cell and a separator were sequentially formed on one side of the optical compensation layer (2). The optical compensation layer (2) had an in-plane retardation Δnd of 120 nm, a thickness direction retardation Rth of 192 nm and an Nz coefficient of 1.6.

(Optical Compensation Layer-Attached Polarizing Plate)

An optical compensation layer-attached polarizing plate was prepared using the system as shown in FIG. 3. The polarizing plate was set in such a manner that its pressure-sensitive adhesive layer side faced the optical compensation layer (1) inserted below. The optical compensation layer (1) was set in such a manner that its pressure-sensitive adhesive layer side was attached to the optical compensation layer (2) placed below. The optical compensation layer (2) was set in such a manner that its pressure-sensitive adhesive layer side faced downward. In the adhesion process, each separator was peeled off except that of the optical compensation layer (2). The separator of the optical compensation layer (2) was left in the laminate.

The belt-shaped film of the polarizing plate (P) and the belt-shaped film of the optical compensation layer (2) were each conveyed from a roll. The film of the optical compensation layer (2) being conveyed from the roll was stretched in the width direction (fixed-end stretching) with its end fixed with respect to the longitudinal direction (film convey direction) so that a slow axis B was produced in the width direction of the optical compensation layer (2). The polarizing plate (P) was conveyed in the direction of the absorption axis A, and the optical compensation layer (2) was conveyed in such a manner that the slow axis B was at 90° (perpendicular) to the absorption axis A. Sheets of the optical compensation layer (1) were interposed between the polarizing plate (P) and the optical compensation layer (2) in such a manner that the slow axis C of the optical compensation layer (1) made an angle of 24° with the absorption axis A of the polarizing plate (P) and bonded to the optical compensation layer (2). Thereafter, the polarizing plate (P) was bonded thereto to form a laminate, and then the laminate was punched into pieces (longitudinal 40 mm and transverse 50 mm) so that optical compensation layer-attached polarizing plates were prepared. The laminate of the optical compensation layers (1) and (2) as shown above had a total retardation value of about 140 nm so that they formed a quarter wavelength plate.

For measurement of uneven heat-up, a sample for uneven heat-up measurement was prepared using the above process and structure of Example 1, except that the absorption axis A of the polarizing plate (P) and the slow axes C and B of the optical compensation layers (1) and (2) were perpendicular to each of the absorption and the slow axes correspond to the Example 1.

Comparative Example 1

Polarizing Plate

The polarizing plate used was the same as that prepared in Example 1.

(Optical Compensation Layer (1'))

An about 60 μm-thick belt-shaped film made of a norbornene resin with a photoelastic coefficient absolute value of $3.10 \times 10^{-12}$ ($m^2/N$) was uniaxially stretched at a stretch ratio of 1.48 at 140° C. to form a 45 μm-thick belt-shaped optical compensation layer (1'). An acrylic pressure-sensitive adhesive layer (20 μm in thickness) for adhering to the optical compensation layer (21 and a separator were sequentially formed on one side of the optical compensation layer (1'). The optical compensation layer (1' had an in-plane retardation Δnd of 270 nm and a thickness direction retardation Rth of 270 nm.

(Optical Compensation Layer (2'))

An about 60 μm-thick belt-shaped film made of a norbornene resin with a photoelastic coefficient absolute value of $3.1 \times 10^{-12}$ ($m^2/N$) was uniaxially stretched at a stretch ratio of 1.46 at 150° C. to form a 50 μm-thick belt-shaped optical compensation layer (2'). An acrylic pressure-sensitive adhesive layer (20 μm in thickness) for adhering to the optical compensation layer (3') and a separator were sequentially formed on one side of the optical compensation layer (2'). The optical compensation layer (2') had an in-plane retardation Δnd of 140 nm and a thickness direction retardation Rth of 140 nm.

(Optical Compensation Layer (3'))

An about 100 μm-thick belt-shaped film made of a norbornene resin with a photoelastic coefficient absolute value of $5.00 \times 10^{-12}$ ($m^2/N$) was longitudinally stretched at a stretch ratio of about 1.27 at 175° C. and then transversely stretched at a stretch ratio of 1.37 at 176° C., so that a 65 μm-thick belt-shaped optical compensation layer (3') was prepared. An acrylic pressure-sensitive adhesive layer (20 μm in thickness) for adhering to a liquid crystal cell and a separator were sequentially formed on one side of the optical compensation layer (3'). The optical compensation layer (3') had an in-plane retardation Δnd of 0 nm and a thickness direction retardation Rth of 110 nm.

(Optical Compensation Layer-Attached Polarizing Plate)

Each film prepared as described above was punched into pieces with a specific size (longitudinal 40 mm and transverse 50 mm), and then the pieces of the optical compensation layers (1'), (2') and (3') were laminated in this order on the piece of the polarizing plate (P). The pieces were sequentially laminated in such a manner that the slow axes of the optical compensation layers (1'), (2') and (3') made angles of 15°, 75° and 75°, respectively, with the absorption axis of the polarizing plate (P). The laminate of the optical compensation layers (1'), (2') and (3') as shown above had a total in-plane retardation value of about 140 nm so that they formed a quarter wavelength plate.

For measurement of uneven heat-up, a sample for uneven heat-up measurement was prepared using the above process and structure of Comparative Example 1, except that the absorption axis A of the polarizing plate (P) and the slow axes of the optical compensation layers (1'), (2') and (3') were perpendicular to each of the absorption and the slow axes correspond to the Comparative Example 1.

Comparative Example 2

Polarizing Plate

The polarizing plate used was the same as that prepared in Example 1.

(Optical Compensation Layer (1"))

An optical compensation layer (1") with the same retardation as that of Example 1 was obtained using the process of Example 1, except that a modified polycarbonate with a photoelastic coefficient absolute value of $5.00 \times 10^{-12}$ ($m^2/N$) (Elmex (PF) Film manufactured by Kaneka Corporation) was used in place of the norbornene resin.

(Optical Compensation Layer (2'))

An optical compensation layer (2") with the same retardation as that of Example 1 was obtained using the process of Example 1, except that a modified polycarbonate with a photoelastic coefficient absolute value of 5.00×10$^{-12}$ (m$^2$/N) (Elmex (PF) Film manufactured by Kaneka Corporation) was used in place of the norbornene resin.

(Optical Compensation Layer-Attached Polarizing Plate)

An optical compensation layer-attached polarizing plate was prepared using the process of Example 1, except that the optical compensation layer (1") was used in place of the optical compensation layer (1) and that the optical compensation layer (2") was used in place of the optical compensation layer (2). The laminate of the optical compensation layers (1") and (2") as shown above had a total in-plane retardation value of about 140 nm so that they formed a quarter wavelength plate.

For measurement of uneven heat-up, a sample for uneven heat-up measurement was prepared using the above process and structure of Comparative Example 1, except that the absorption axis A of the polarizing plate (P) and the slow axes B and C of the optical compensation layers (1") and (2") were perpendicular to each of the absorption and the slow axes correspond to the Example 1.

The optical compensation layer-attached polarizing plates prepared in the example and the comparative examples were evaluated as described below. The results are shown in Table 1.

(Thickness)

The thickness of each sample was measured with a dial gauge manufactured by OZAKI MFG. CO., LTD.

(Uneven Heat-UP)

In the measurement of uneven heat-up, the prepared sample and the sample for uneven heat-up measurement were attached to one and the other principal surfaces of a liquid crystal cell (VA mode), respectively, in such a manner that air and foreign matter were prevented from entering between the liquid crystal cell and each sample, and the degree of blackness was measured. When the degree of blackness was measured, the laminate of the samples and the liquid crystal cell was placed above a backlight, and the image on the cell irradiated with the backlight was photographed with a digital camera. The picture was converted into a gray scale image with Win Roof v3.0 produced by Mitani Corporation, and on a gray scale of 0 to 255, 35 was used as a threshold. Specifically, binary coded processing was performed in which values of 0 to 35 were defined as white, while 35 to 255 as black, and white parts were quantified. Each percentage value in the uneven heat-up measurement table below indicates the ratio of the white parts in the image. In the measurement of uneven heat-up, the ratio of the white parts in the image was measured before and after heating (heating conditions: 85° C. for 10 minutes). When the amount of change in the ratio of the white parts by the heating was small, uneven heat-up was evaluated as small, and when the amount of change was large, it was evaluated as large.

TABLE 1

|  | Thickness (μm) | Uneven Heat-Up | | |
|---|---|---|---|---|
|  |  | Before Heating (%) | After Heating (%) | Amount of Change (%) |
| Example 1 | 248 | 1.26 | 1.82 | 0.56 |
| Comparative Example 1 | 348 | 7.53 | 12.18 | 4.56 |
| Comparative Example 2 | 248 | 11.46 | 41.23 | 29.86 |

From the results in Table 1, it is apparent that the thickness is smaller in Example 1 than in Comparative Example 1 and that the degree of uneven heat-up is smaller in Example 1 than in Comparative Examples 1 and 2. This indicates that the use of a laminate of the optical compensation layers (1) and (2) in the optical compensation layer-attached polarizing plate significantly reduces the thickness and suppresses uneven heat-up. In all of Example 1 and Comparative Examples 1 and 2, similar viewing angle compensation and broadband circular polarization were achieved.

Example 2

An optical compensation layer-attached polarizing plate was prepared using the process of Example 1, except that the optical compensation layer (1) was interposed between the polarizing plate (P) and the optical compensation layer (2) in such a manner that the slow axis C of the optical compensation layer (1) made an angle of 10° with the absorption axis A of the polarizing plate (P).

Example 3

An optical compensation layer-attached polarizing plate was prepared using the process of Example 1, except that the optical compensation layer (1) was interposed between the polarizing plate (P) and the optical compensation layer (2) in such a manner that the slow axis C of the optical compensation layer (1) made an angle of 14° with the absorption axis A of the polarizing plate (P).

Example 4

An optical compensation layer-attached polarizing plate was prepared using the process of Example 1, except that the optical compensation layer (1) was interposed between the polarizing plate (P) and the optical compensation layer (2) in such a manner that the slow axis C of the optical compensation layer (1) made an angle of 20° with the absorption axis A of the polarizing plate (P).

Example 5

An optical compensation layer-attached polarizing plate was prepared using the process of Example 1, except that the optical compensation layer (1) was interposed between the polarizing plate (P) and the optical compensation layer (2) in such a manner that the slow axis C of the optical compensation layer (1) made an angle of 30° with the absorption axis A of the polarizing plate (P).

Comparative Example 3

An optical compensation layer-attached polarizing plate was prepared using the process of Example 1, except that the optical compensation layer (1) was interposed between the polarizing plate (P) and the optical compensation layer (2) in such a manner that the slow axis C of the optical compensation layer (1) is parallel (made an angle of 0°) with the absorption axis A of the polarizing plate (P).

Comparative Example 4

An optical compensation layer-attached polarizing plate was prepared using the process of Example 1, except that the optical compensation layer (1) was interposed between the polarizing plate (P) and the optical compensation layer (2) in such a manner that the slow axis C of the optical compensation layer (1) made an angle of 5° with the absorption axis A of the polarizing plate (P).

Comparative Example 5

An optical compensation layer-attached polarizing plate was prepared using the process of Example 1, except that the optical compensation layer (1) was interposed between the polarizing plate (P) and the optical compensation layer (2) in such a manner that the slow axis C of the optical compensation layer (1) made an angle of 35° with the absorption axis A of the polarizing plate (P).

Comparative Example 6

An optical compensation layer-attached polarizing plate was prepared using the process of Example 1, except that the optical compensation layer (1) was interposed between the polarizing plate (P) and the optical compensation layer (2) in such a manner that the slow axis C of the optical compensation layer (1) made an angle of 40° with the absorption axis A of the polarizing plate (P).

Example 6

Each of the polarizing plate (P) and the optical compensation layers (1) and (2), which were the same as in Example 1, was punched into a specific size, and the resulting pieces of the polarizing plate (P) and the optical compensation layers (1) and (2) were laminated in this order to form an optical compensation layer-attached polarizing plate. The slow axes C and B of the optical compensation layers (1) and (2) sequentially made an angle of 24° and an angle of 70°, respectively, counterclockwise with respect to the absorption axis A of the polarizing plate (P). The lamination of the polarizing plate (P) and the optical compensation layers (1) and (2) was performed using an acrylic pressure-sensitive adhesive (20 μm in thickness). The resulting optical compensation layer-attached polarizing plate was punched into pieces (longitudinal 40 mm and transverse 50 mm) in such a manner that the absorption axis A of the polarizing plate (P) was in the width direction.

Example 7

An optical compensation layer-attached polarizing plate was prepared using the process of Example 6, except that the optical compensation layer (2) was placed in such a manner that the slow axis B of the optical compensation layer (2) made an angle of 85° with the absorption axis A of the polarizing plate (P).

Example 8

An optical compensation layer-attached polarizing plate was prepared using the process of Example 6, except that the optical compensation layer (2) was placed in such a manner that the slow axis B of the optical compensation layer (2) made an angle of 95° with the absorption axis A of the polarizing plate (P).

The optical compensation layer-attached polarizing plates obtained in Examples 1 to 8 and Comparative Examples 3 to 6 were measured for transmittance by the method described below. A pair of each type of optical compensation layer-attached polarizing plates was laminated to form a sample to be measured for transmittance. The lamination was performed in such a manner that the absorption axes of the polarizing plates (the polarizers (P)) were perpendicular to each other and the optical compensation layers (2) faced each other. The sample was measured for transmittance at 550 nm with DOT-3 (trade name, manufactured by Murakami Color Research Laboratory). The results are shown in Table 2. The ratio of the transmittance of each example to that of Example 1 is also shown in Table 2.

TABLE 2

| | Angle Between Absorption Axis of Polarizing Plate and Slow Axis of Optical Compensation Layer (1) (°) | Angle Between Absorption Axis of Polarizing Plate and Slow Axis of Optical Compensation Layer (2) (°) | Transmittance (%) | Transmittance Ratio to Example 1 |
|---|---|---|---|---|
| Example 1 | 24 | 90 | 0.044 | 1.00 |
| Example 2 | 10 | 90 | 0.069 | 1.56 |
| Example 3 | 14 | 90 | 0.054 | 1.22 |
| Example 4 | 20 | 90 | 0.042 | 0.95 |
| Example 5 | 30 | 90 | 0.067 | 1.52 |
| Comparative Example 3 | 0 | 90 | 0.109 | 2.47 |
| Comparative Example 4 | 5 | 90 | 0.088 | 2.00 |
| Comparative Example 5 | 35 | 90 | 0.101 | 2.30 |
| Comparative Example 6 | 40 | 90 | 0.165 | 3.75 |
| Example 6 | 24 | 75 | 0.047 | 1.06 |
| Example 7 | 24 | 85 | 0.040 | 0.90 |
| Example 8 | 24 | 95 | 0.050 | 1.19 |

Table 2 indicates that when the angle between the absorption axis of the polarizing plate (P) and the slow axis of the optical compensation layer (1) is in the range of 10 to 30° and when the angle between the absorption axis of the polarizing plate (P) and the slow axis of the optical compensation layer (2) is in the range of 75 to 95°, the transmittance of the laminate in the crossed Nicol arrangement is very low, namely light leakage is well prevented when black viewing is displayed. It is also apparent that when the angle between the absorption axis of the polarizing plate (P) and the slow axis of the optical compensation layer (1) or (2) falls outside the above range, the transmittance of the laminate in the crossed-Nicol arrangement is very high, namely light leakage is significant and an impractical level when black viewing is displayed. The degree of uneven heat-up was small in Examples 2 to 8 as well as in Example 1.

INDUSTRIAL APPLICABILITY

The optical compensation layer-attached polarizing plate of the invention is useful as a circularly polarizing plate, useful alone or in combination with any other optical film to form a variety of optical films, and suitable for use in liquid crystal panels and liquid crystal displays using such liquid crystal panels.

The invention claimed is:

1. An optical compensation layer-attached polarizing plate, comprising a polarizing plate, an optical compensation layer (1) and another optical compensation layer (2) that are laminated in this order, wherein the optical compensation layer (1) has the relation $nx_1 > ny_1 = nz_1$, comprises a resin with a photoelastic coefficient absolute value of at most $2.0 \times 10^{-11}$ m$^2$/N, and has an in-plane retardation $(nx_1 - ny_1)d_1$ in the range of 200 nm to 300 nm, where $nx_1$ is a refractive index in the direction of X axis along which the film in-plane refractive index is maximum, $ny_1$ is a refractive index in the direction of Y axis perpendicular to X axis, $nz_1$ is a refractive index in the direction of Z axis that is the film thickness direction, and $d_1$ is the film thickness (nm), the another optical compensation layer (2) has the relation $nx_2 > ny_2 > nz_2$, comprises a resin with a photoelastic coefficient absolute value of at most $2.0 \times 10^{-11}$ m$^2$/N, and has an in-plane retardation $(nx_2 - ny_2)d_2$ in the range of 90 nm to 160 nm, where $nx_2$ is a refractive index in the direction of X axis along which the film in-plane refractive index is maximum, $ny_2$ is a refractive index in the direction of Y axis perpendicular to X axis, $nz_2$ is a refractive index in the direction of Z axis that is the film thickness direction, and $d_2$ is the film thickness (nm), a slow axis of the optical compensation layer (1) makes an angle of 10° to 30° with an absorption axis of the polarizing plate, and a slow axis of the another optical compensation layer (2) makes an angle of 75° to 95° with the absorption axis of the polarizing plate.

2. The optical compensation layer-attached polarizing plate according to claim 1, wherein the another optical compensation layer (2) has an Nz coefficient in the range of 1.3 to 1.9, where the Nz coefficient is defined by the formula $Nz = (nx_2 - nz_2)/(nx_2 - ny_2)$.

3. The optical compensation layer-attached polarizing plate according to claim 1, wherein the optical compensation layer (1) is an optical film produced by uniaxially stretching a polymer film comprising a norbornene resin.

4. The optical compensation layer-attached polarizing plate according to claim 1, wherein the another optical compensation layer (2) is an optical film produced by biaxially stretching a polymer film comprising a norbornene resin.

5. The optical compensation layer-attached polarizing plate according to claim 1, wherein the polarizing plate, the optical compensation layer (1) and the another optical compensation layer (2) are laminated with a pressure-sensitive adhesive.

6. A liquid crystal panel comprising the optical compensation layer-attached polarizing plate according to claim 1 and a liquid crystal cell.

7. A liquid crystal display, comprising the liquid crystal panel according to claim 6.

8. An image display, comprising the optical compensation layer-attached polarizing plate according to claim 1.

9. A method for producing an optical compensation layer-attached polarizing plate comprising a polarizing plate, an optical compensation layer (1) and another optical compensation layer (2) that are laminated in this order, wherein the optical compensation layer (1) has the relation $nx_1 > ny_1 = nz_1$, comprises a resin with a photoelastic coefficient absolute value of at most $2.0 \times 10^{-11}$ m$^2$/N, and has an in-plane retardation $(nx_1 - ny_1)d_1$ in the range of 200 nm to 300 nm, where $nx_1$ is a refractive index in the direction of X axis along which the film in-plane refractive index is maximum, $ny_1$ is a refractive index in the direction of Y axis perpendicular to X axis, $nz_1$ is a refractive index in the direction of Z axis that is the film thickness direction, and $d_1$ is the film thickness (nm), the another optical compensation layer (2) has the relation $nx_2 > ny_2 > nz_2$, comprises a resin with a photoelastic coefficient absolute value of at most $2.0 \times 10^{-11}$ m$^2$/N, and has an in-plane retardation $(nx_2 - ny_2)d_2$ in the range of 90 nm to 160 nm, where $nx_2$ is a refractive index in the direction of X axis along which the film in-plane refractive index is maximum, $ny_2$ is a refractive index in the direction of Y axis perpendicular to X axis, $nz_2$ is a refractive index in the direction of Z axis that is the film thickness direction, and $d_2$ is the film thickness (nm), comprising the steps of:

continuously conveying the polarizing plate and the another optical compensation layer (2) from rolls thereof, respectively, in such a manner that an absorption axis of the polarizing plate makes an angle of 75° to 95° with a slow axis of the another optical compensation layer (2) and that their longitudinal directions are aligned with each other, interposing the optical compensation layer (1) between the continuously conveyed polarizing plate and the another optical compensation layer (2) in such a manner that a slow axis of the optical compensation layer (1) makes an angle of 10° to 30° with the absorption axis of the polarizing plate, and laminating the polarizing plate, the optical compensation layer (1) and the another optical compensation layer (2).

10. The method for producing the optical compensation layer-attached polarizing plate comprising a polarizing plate according to claim 9, wherein the another optical compensation layer (2) has an Nz coefficient in the range of 1.3 to 1.9, where the Nz coefficient is defined by the formula $Nz = (nx_2 - nz_2)/(nx_2 - ny_2)$.

11. The method for producing the optical compensation layer-attached polarizing plate comprising a polarizing plate according to claim 9, wherein the optical compensation layer (1) is an optical film produced by uniaxially stretching a polymer film comprising a norbornene resin.

12. The method for producing the optical compensation layer-attached polarizing plate comprising a polarizing plate according to claim 9, wherein the another optical compensation layer (2) is an optical film produced by biaxially stretching a polymer film comprising a norbornene resin.

13. The method for producing the optical compensation layer-attached polarizing plate comprising a polarizing plate according to claim 9, wherein the polarizing plate, the optical compensation layer (1) and the another optical compensation layer (2) are laminated with a pressure-sensitive adhesive.

* * * * *